United States Patent [19]

Osada et al.

[11] 4,212,719

[45] Jul. 15, 1980

[54] METHOD OF PLASMA INITIATED POLYMERIZATION

[75] Inventors: Yoshihito Osada, Yokohama, Japan; Alexis T. Bell, Oakland; Mitchel M. Shen, Piedmont, both of Calif.

[73] Assignee: The Regents of the University of California, Berkeley, Calif.

[21] Appl. No.: 934,855

[22] Filed: Aug. 18, 1978

Related U.S. Application Data

[63] Continuation-in-part of Ser. No. 882,124, Feb. 28, 1978, abandoned.

[51] Int. Cl.² ................................................ C08F 2/52
[52] U.S. Cl. .................................... 204/165; 204/168; 204/169
[58] Field of Search ......................... 204/165, 168, 169

[56] References Cited

U.S. PATENT DOCUMENTS

| | | | |
|---|---|---|---|
| 2,257,177 | 9/1941 | Luster | 204/168 |
| 2,551,035 | 5/1951 | Miller | 204/165 |
| 2,632,729 | 3/1953 | Woodman | 204/72 |
| 3,287,242 | 11/1966 | Tobin et al. | 204/165 |
| 3,475,307 | 10/1969 | Knox et al. | 204/168 |
| 3,661,735 | 5/1972 | Drelich | 204/165 |
| 4,013,532 | 3/1977 | Cormia et al. | 204/192 |

*Primary Examiner*—F. C. Edmundson
*Attorney, Agent, or Firm*—Flehr, Hohbach, Test, Albritton & Herbert

[57] ABSTRACT

An ionized gas plasma is established in an electrical field in contact with a non-vapor volume of monomer (liquid and/or solid). The plasma creates active polymerization sites in the monomer volume to initiate propagation of polymerization therein. After initiation, the partially-polymerized monomer volume is postpolymerized in the absence of the ionized gas plasma to yield a very high molecular weight polymer which may be essentially free of cross-linking in desirable forms including commercial quantities of bulk self-supporting polymer or a coating. Suitable monomers include liquid vinyl monomers (e.g., methyl, methacrylate) and solid crystalline monomers (e.g., 1,3,5-trioxane).

32 Claims, 2 Drawing Figures

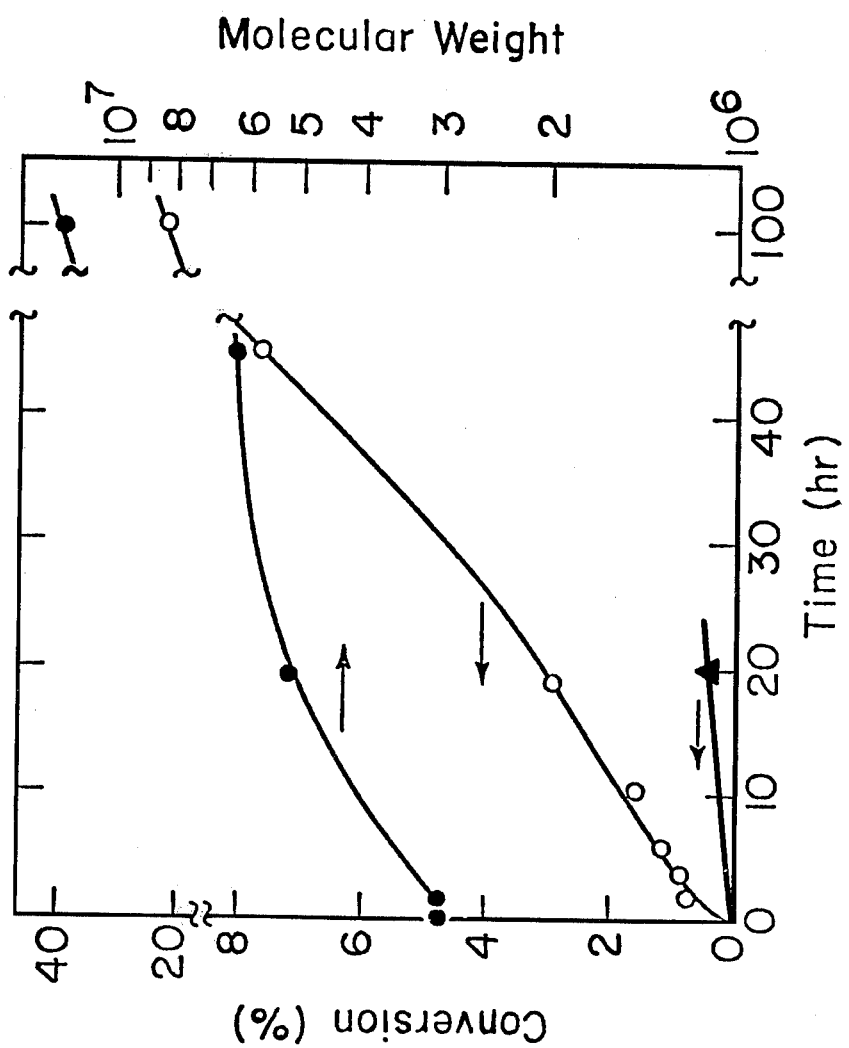

METHOD OF PLASMA INITIATED POLYMERIZATION

CROSS-REFERENCE TO RELATED APPLICATION

This application is a continuation-in-part of our copending application Ser. No. 882,124, filed Feb. 28, 1978, now abandoned; entitled "A Method of Plasma Initiated Polymerization".

BACKGROUND OF THE INVENTION

Application of an electric field to a gas, generally under vacuum, to form a plasma of gas ions is a known technique used in polymerization of monomers. This technique has been described, for example, in Luster U.S. Pat. No. 2,257,177. In general, the art teaches continuous contact of the polymerizing monomer in the vapor phase with the gas plasma until substantial completion of the polymerization in a film on a substrate. In addition to being energy intensive, this technique tends to form a cross-linked product which is solvent insoluble and so not suitable for many applications. Specifically, in Tobin U.S. Pat. No. 3,287,242, the degree of completion of polymerization contact with an electrical discharge is illustrated in the examples to be 45 to 60% while no further polymerization is contemplated as the polymer is immediately thereafter recovered. Also, the product is stated to be highly cross-linked.

Due to the high cross-linking associated with plasma polymerization, that technique is generally employed only for the purpose of forming thin films. The state of the art has taught that activation is confined to a region near the surface of the monomer at which links and cross-links form while the monomer in bulk below the surface is not polymerized. See, e.g., col. 1 of Cormia et al U.S. Pat. No. 4,013,532.

One modification of the film forming techniques in which the monomer is polymerized directly from the gas state is described in Knox et al U.S. Pat. No. 3,475,307. There, the substrate is cooled to condense a thin layer of liquid monomer on the substrate in order to increase the polymerization rate. However, that patent teaches one should avoid condensing "too much" of the monomer on the surface because otherwise the incoming activated molecules from the gas phase would not reach the monomer removed from the gas liquid interface which is stated to cause a coating of little adherence (col. 10, lines 54–60). The order of magnitude of condensed monomer prior to polymerization is indicated as being few molecules thickness (col. 4, lines 1–4).

Another process employing an electric current for polymerization is described in Woodman U.S. Pat. No. 2,632,729. There, an aqueous emulsion of a water-insoluble monomer and containing electrolyte is polymerized by conducting electricity through the emulsion using the electrolyte. This reference states that a gas discharge in the gas phase (i.e., one that would create an ionized gas plasma) is to be avoided. Instead, current is to be directed between the liquid and the gas, preferably with the negative electrode immersed in the aqueous dispersion. (Col. 5, lines 5–26). The reference further indicates without detail that the range of molecular weights of the polymeric materials could be controlled by propagation of the polymerization apart from the zone of discharge to vary the length of time during which the volume of dispersed materials is exposed to the discharge. (Col. 6, lines 9–24). There are a number of disadvantages to the Woodman process including the indicated requirement for extraneous electrolyte and emulsifier which are difficult to remove from the final polymer. Furthermore, the system is limited to monomers insoluble in water which are capable of being emulsified therewith.

SUMMARY OF THE INVENTION AND OBJECTS

In accordance with the present invention, polymerization of a non-vapor phase (liquid and/or solid) monomer is accomplished by ionized gas plasma initiation which is followed by a postpolymerization step of substantially longer duration in the absence of plasma contact. This two-stage polymerization process can form a polymer product of high molecular weight essentially free of cross-linking and essentially all straight chained. In addition, it is capable of forming coatings or commercial self-supporting bulk quantities of polymer using relatively low power input.

It is an object of the invention to provide a versatile ionized gas plasma initiated polymerization technique of lower power input in comparison to conventional plasma techniques.

It is a further object of the invention to provide a plasma initiated technique capable of producing commercial bulk quantities of polymer of high molecular weights at high purity free of cross-linking.

Other objects and features of the invention will be apparent from the following description taken in conjunction with the accompanying drawing.

BRIEF DESCRIPTION OF THE DRAWING

The drawing is a graph illustrating percent conversion and molecular weight as a function of time after termination of the plasma discharge for a methyl methacrylate monomer.

DETAILED DESCRIPTION OF THE PREFERRED EMBODIMENTS

The principle of the present invention is to initiate polymerization by use of a non-equilibrium ionized gas plasma and to complete the majority of the polymerization in the absence of the plasma. In this manner, a high molecular weight polymer is formed.

The formation of the ionized gas plasma (herein plasma) may be accomplished in any of the techniques known to produce such plasmas. For example, see J. R. Hollahan and A. T. Bell, eds., "Techniques in Applications of Plasma Chemistry", Wyley, New York, 1974 and M Shen, ed. "Plasma Chemistry of Polymers", Dekker, New York, 1976. In one technique, an ionizable gas is contained under vacuum between parallel plate electrodes connected to a radiofrequency generator which is sold by International Plasma Corporation under the designation "Model 3001". The plasma can be created with such parallel plates either external or internal to the vacuum chamber. In another technique, an external induction coil creates an electric field which produces the plasma of ionized gas. In yet another technique, oppositely charged electrode points are placed directly into the vacuum chamber in spaced apart relationship to create the plasma. The present invention is applicable to any plasma formed by these techniques or any other one in which an electric field creates a path of electrical conduction totally within the gas phase. As used herein, the term plasma is to be distinguished from any liquid or solid environment in which an electric field is applied to create ions in a path through the solid or liquid. This is not to exclude the possibility that an electric field would also be applied across the non-vapor monomer. However, if it were, it is not believed that it would have any beneficial function; instead, it would be extraneous to the vapor phase plasma.

The operating parameters for the plasma vary from monomer to monomer. In general, it is preferable to employ reduced gas pressures to form a glow discharge by electron liberation which causes ionization in the gas phase.

Where a plasma is created in a chamber including a monomer gas at a pressure below atmospheric pressure, the plasma is formed when the interelectrode potential exceeds a threshhold value which is sufficient to ionize or "breakdown" the gas. This is a function of the composition of the gas, its pressure and the distance between the electrodes. After breakdown, the gas is conductive and a stable plasma may be maintained over a wide range of currents. Although the exact composition of the plasma is not known, it is believed to include electrons, ions, free radicals, and other reactive species.

In accordance with the present invention, the foregoing reactive species in the plasma either directly or indirectly initiate the propagation polymerization of a non-vapor phase volume of monomers in contact with the plasma, as described below. In the direct technique, the ions or free radicals themselves create active polymerization sites at the interface of the plasma and non-vapor monomer surface. In the indirect technique, such ions in the plasma field initiate the production of free radicals which create a chain reaction with the non-vapor monomer in contact with the plasma to cause propagation polymerization to occur.

The free radicals and/or ions in the plasma may be supplied by collision of plasma electrons with monomer vaporized from the non-vapor monomer to be polymerized. The monomer may be in the form of a liquid, a solid, or a solid-liquid mixture. For the liquid monomer, the monomer vapor is supplied by evaporation of monomer into the plasma which is facilitated by the application of a vacuum. Similarly, for the solid monomer, such free radicals and/or ions are supplied by sublimed monomer vapor. For simplicity of description, the non-vapor monomer to be polymerized will be described herein as being in the liquid state unless otherwise specified.

In a related procedure, the creation of active polymerization sites in the liquid monomer may be facilitated by direct activation from the ionized gas, itself, in the plasma. For this purpose, the presence of any ionizible gas under the conditions prevalent in the plasma may be employed. For example, water vapor may be ionized to create active polymerization sites for certain liquid monomers. Other gases which have been ionized by such plasmas include hydrogen chloride, carbon tetrachloride, and inert gases such as helium or neon. Those gases which are ionizable in the plasma are well known to those in the field.

The liqud monomer to be polymerized may be in the essentially pure monomeric state or in solution. In the latter instance, organic or inorganic solvents capable of complete dissolution of the monomer may be employed. Typical organic solvents for certain monomers include benzene and acetone. While water is the most common inorganic solvent, in certain instances, other ones may be employed such as carbon disulfide. Where water or other ionizable liquid is employed as the solvent for the monomer, it serves the additional function of providing the source of ionizable gas in the plasma discharge to assist in creating active polymerization sites in the monomer.

When a glow-discharge type of plasma is employed, excess vaporization of monomer may interfere with the plasma. Thus, when a pure normally liquid monomer of relatively high vapor pressure is employed, it is desirable to reduce its vapor pressure. For example, the monomer may be frozen to a solid form for plasma initiation in that state or warmed to a mixed solid-liquid state prior to plasma initiation.

ADDITION POLYMERIZATION EMBODIMENT

Any monomer capable of addition or chain polymerization should be suitable to the present process so long as the gas plasma is capable of providing ions and/or free radicals which create active polymerization sites at the interface with the monomer. After such sites are created, propagation of polymerization and transfer of active sites followed by cessation is carried out in accordance with conventional addition polymerization. This form of the invention will be referred to herein as the addition polymer embodiment.

The most common monomer to which the present invention is applicable is an unsaturated organic compound which includes one or more double or triple bonds. Although dienes and higher numbers of double bonded monomers may be employed, the most frequently employed and preferred monomer for use herein is of the monoethylenic type, more specifically a vinyl monomer.

Suitable vinyl monomers which have been employed successfully include alkyl esters of acrylic acid and methacrylic acid (methyl methacrylate, ethyl methacrylate, butyl methacrylate, methyl acrylate, butyl acrylate), and also acrylic acid and methacrylic acid and other derivatives such as methacrylamide and acrylamide. In addition, copolymers of these vinyl monomers with one or more of them or with other monomers, vinyl or not, may also be employed. Furthermore, it is believed that the other ethylenically unsaturated monomers (e.g., the alkylenes (ethylene or propylene) and styrene and its derivatives) are suitable with appropriate adjustments of the conditions of reaction.

One feature of the present invention is that it is capable of creating a high purity polymer. Alternatively, polymerization may be carried out in a solvent which can serve to lower the viscosity of the liquid monomer or to dissolve a solid crystal polymer to provide a relatively low viscosity liquid polymer which facilitates propagation of polymerization.

The function of the plasma is to just initiate propagation by creating active sites at the interface between the gas plasma and liquid monomer. As soon as such polymerization sites are created, the plasma may be discontinued. This could be accomplished by removing the electric field or by moving the partially-polymerized polymer away from the same. In the latter instance, it is envisioned that a continuous process could be employed in which liquid monomer flows into a chamber containing the gas plasma, has a residence time sufficient to create the desired number of active sites, and then is passed out of the chamber.

In direct contradiction of the prior art, applicants have unexpectedly discovered that once the active polymerization sites are created in the liquid monomer, the plasma is no longer required. Of course, the exact timing of the creation of sufficient active sites is a matter of trial and error dependent upon the particular monomer, its physical state and the characteristics of the plasma itself. By way of guidance, initiation periods as short as 30 seconds or less to a half-hour have been found to be sufficient. In no instance has it been required to continue contact with the plasma in excess of 1 hour. One advantage of minimizing the plasma contact or initiation period is that it results in significant reductions in power input to the system. In addition, the final products may have extraordinarily high molecular weights, e.g., on the order of $1 \times 10^7$ for poly(methyl methacrylate). Also, such polymers may have exceptional physical properties such as toughness and craze resistance equal or superior to those formed by conventional non-plasma polymerization of vinyl monomers. Such polymers may be formed essentially free of cross-linking which is desirable for ease of processing and/or fabrication as thermoplastic polymers. Freedom from cross-linking also renders the polymer completely soluble in an appropriate solvent.

It is believed that in most instances continuation of plasma contact with the liquid monomer through substantial polymerization would cause cross-linking as set out in the prior art. Thus, this is to be avoided not only to reduce the energy intensiveness of the system but also to retain ease of processing.

As set out above, once the active polymerization sites are created at the interface of the liquid monomer and gas plasma, subsequent polymerization, referred to herein as postpolymerization, of the partially polymerized monomer volume can be carried out in the absence of the gas plasma. This is believed to occur by chain propagation from the active polymerization sites in progression from the interface inwardly through the volume of the monomer liquid until polymerization is substantially complete, i.e., the desired endpoint of conversion is reached. The degree of conversion during plasma initiation is relatively small in comparison to postconversion. Thus, for example, during plasma initiation, very low conversion is sufficient for active polymerization sites to achieve the desired uniform degree of polymerization through the liquid monomer. No greater than 1 to 2% conversion during plasma initiation should be required. Of course, one could continue plasma initiation up to as high as 10% conversion but this would not to be conservative of energy and would not perform any useful function as presently contemplated. In addition, such excess contact with the plasma may cause undesired cross-linking. Typical final conversion percentages for this process are comparable to those obtained by conventional polymerization techniques of the prior art.

In view of the preceding paragraph, another way to express the preferred degree of polymerization during plasma initiation is to compare the total conversion after postpolymerization to the plasma conversion during plasma initiation. In that light, it is preferable that the final percentage of polymer conversion based on initial monomer be at least two times that converted prior to termination of plasma initiation. In most instances, this will be a far higher ratio, namely, greater than ten times.

A major advantage of the foregoing process is the ability to produce economically a uniform high molecular weight polymer with essentially no cross-linking and generally straight chained in high purity form with its consequent excellent physical properties. It is particularly useful for the production of commercial self-supporting bulk quantities of such polymer with relatively low power input as the plasma need only be contacted with the polymer during initiation. Thus, a monomer volume in a bulk three-dimensional form or a self-supporting film could be polymerized with only a minor power input to provide plasma initiation. This renders the process applicable to bulk polymerization in which the polymer is removed from the polymerization vessel subsequent to polymerization rather than remaining adhered to a substrate or the like. On the other hand, it could be employed to form a film adhered to a substrate of high molecular weight.

The foregoing disclosure relates to bulk and solution monomer form. It should be understood that the solid and/or liquid forms of other conventional polymerization techniques may also be employed. See, e.g., *Principles of Polymer Systems*, F. Rodriguez (New York, 1970).

In another form of the addition polymer embodiment, the monomer is in solid crystalline form. Such polymer may be of the vinyl type, including vinyl naphthalene, vinyl anthracene and the aforementioned acrylamide. Other suitable addition polymers are of the triple bond type (e.g., substituted or unsubstituted diacetylene). The foregoing plasma initiation and postpolymerization principles apply to such crystalline polymers. Other unsaturated organic compounds in crystalline form which may be polymerized using the present process include the following monomers: cholesteryl methacrylate, vinyl ferrocene, N-vinyl carbazole, and sodium acrylate.

RING-OPENING POLYMERIZATION EMBODIMENT

A number of monomers are known in the form of cyclic ring organic compounds of a solid crystalline nature. In addition, it is known that such cyclic rings may be opened as by high energy including gamma rays, alpha rays, and x-rays. It has been found that the far less expensive technique of ionized gas plasma initiation followed by postpolymerization of substantially longer duration in the absence of the plasma contact is also applicable to such monomers. This form of the invention will be referred to herein as the "ring-opening" embodiment.

One class of ring compound monomers of this type include a repeating —(R—Z)— unit in which Z may be oxygen, sulfur, or an amino group wherein R is a substituted or unsubstituted aliphatic hydrocarbon. In one preferred form of the invention, Z is oxygen and the cyclic compound is 1,3,5-trioxane (TOX) or 1,3,5,7-tetraoxane (TEOX). It is believed that the sulfur analog of TOX or TEOX (e.g., tetramethylene disulfide) could also be employed as the crystalline monomer of the present invention. In addition, such cyclic organic amine compounds as propylene imine are believed to be suitable for the present invention. Furthermore, other cyclic organic compounds such as 2,5-distyrylpyrazine, α,α'-dicyano-p-phenylene diacrylic acid n-propyl ester may also be employed.

The following description of the ring-opening embodiment will refer to the polymerization of TOX or TEOX to form crystalline polyoxymethylene (POM). However, it should be understood that the same principles are applicable to the other crystalline cyclic ring compounds to be polymerized in accordance with the present method.

The foregoing description of the technique for forming the gas plasma is applicable to the ring-opening embodiment. In addition, the same relationship between plasma initiation and subsequent polymerization is also applicable. Thus, the function of the plasma is to just initiate polymerization by creating active sites by breaking the cyclic rings. Thereafter, the plasma is discontinued and polymerization proceeds in the absence of the plasma. Thus, initiation periods as short as 1 second or less than 10 minutes may be sufficient for the POM embodiment.

As set out above, the degree of conversion during plasma initiation is relatively small in comparison to postconversion. Thus, no greater than 1 to 2% conversion during plasma initiation should be required. As with the addition polymer embodiment, it is preferable that the final percentage of polymer conversion based on initial monomer be at least 2 times that converted prior to termination of plasma initiation. In most instances, it will be a far higher ratio, namely, greater than 10 times.

A particular advantage of this ring-opening embodiment is that the monomer crystals polymerize after exposure to low pressure electrical discharge plasma form a highly crystalline POM polymer of distinctive characteristics. The polymer crystals have a fibrous appearance and are insoluble in methanol, acetone and other organic solvents. The diffraction pattern is typical of fiber diagrams with the fiber axis parallel to the C-axis of the original monomer unit cell. The POM crystals maintained the original shape of the monomer crystals. Thus, the major portion of the crystalline polymer is a single crystal.

It is believed that the crystalline nature of the monomer is a strong contributing factor to high conversion subsequent to termination of gas plasma contact. That is, the monomer molecules align in a crystalline stack forming a favorable geometry to continuing transfer of the ring-opening active sites formed during initial contact with the gas plasma. This same principle is applicable to polymerization of crystalline monomer by the addition polymer embodiment.

Postpolymerization of the ring-opening embodiment may be performed at any temperature up to the melting point of the monomer. At higher temperatures, the rate of polymerization is increased. The atmosphere may be ambient air, vacuum, or in an inert gas, and may include monomer vapor.

A further disclosure of the nature of the present invention is provided by the following specific examples of the practice of the invention. It should be understood that the data disclosed serve only as examples and are not intended to limit the scope of the invention.

EXAMPLE 1

An extensive study wasy made using the foregoing process for the polymerization of monomeric methyl methacrylate purchased from Polysciences, Inc. It was vacuum distilled, sealed in a thin-balled ampule after degassing at $10^{-3}$ to $10^{-4}$ torr., and subsequently frozen in liquid nitrogen. The ampule was then inserted between a pair of external parallel plate electrodes connected to an International Plasma Corporation Model 3001 radiofrequency generator which operates at 13.56 MHz frequency and delivers up to 150 watts power. The ampule is permitted to warm until droplets of liquid monomer appeared (the equilibrium melting temperature of methyl methacrylate is $-45°$ C.). A glow discharge was then generated at a power of about 50 to 100 watts and discontinued within about 30–60 seconds to create active polymerization sites in the liquid monomer. After such initiation, the ampule was maintained in the absence of the discharge and at a constant temperature for various times, after which the seal was broken and the contents precipitated and analyzed. Approximate molecular weights were estimated by measuring the intrinsic viscosity of the polymer in benzene. High resolution NMR (180 MHz) was used to determine the microtacticity of the polymer dissolved in deuterated chloroform (0.2%) at room temperature. The conversion of methyl methacrylate as a function of time is illustrated in the drawing. The percentage conversion was computed as a weight ratio of polymer to monomer charge. From this data, the rate of polymerization was estimated to be $4 \times 10^{-6}$ moles/liter sec.

It is noted that the molecular weight of the resulting polymer together with the rate of polymerization are both very high in comparison to conventional polymerization techniques. For example, ten minutes after initiation, the molecular weight of the polymer had reached $3 \times 10^6$ g/mole. The polymer was linear and totally soluble in its solvents. Further experiments indicate that the mechanism of polymerization is of the free radical type.

EXAMPLE 2

The foregoing techniques were employed in separate ampules with methacrylic acid and acrylic acid, respectively. The polymers formed after plasma initiation. However, as the resulting polymers are insoluble in their monomer, they precipitated from the medium. No substantial postpolymerization was observed at 5° C.

In further experiments, these same monomers were successfully postpolymerized to high conversions by carrying the polymerization out in an aqueous medium in which the polymer is soluble. The polymerization proceeded homogeneously. Specifically, the two monomers were dissolved in separate ampules of 75% aqueous solution. After the glow discharge of about 15 seconds, the poly(methacrylic acid) formed with a high molecular weight of $4.5 \times 10^6$ with a postpolymerization greater than 80% at 5° C. for 90 hours. Similarly, for the acrylic acid, after a 15 second plasma initiation, the polymer conversion was 50% under the same time and temperature conditions.

EXAMPLE 3

Aqueous solutions of methacrylamide and acrylamide were dissolved in 30% and 50% aqueous solutions, after 12 and 15 second, respectively, and plasma initiation was commenced as in Example 1. Under postpolymerization conditions of 45 hour at 20° C., the methacrylamide monomer had a polymer conversion of 80% while the acrylamide monomer was greater than 60%. It is noted that, for some reason, the methacrylamide produced a swollen but somewhat insoluble polymer in water.

EXAMPLE 4

Alkyl esters of methacrylic acid and acrylic acid were also polymerized by the foregoing general techniques. Specifically, in bulk, after a 60 second plasma initiation, a 1% conversion was observed in bulk ethyl methacrylate after 168 hours at 5° C. After a 30 second plasma initiation, bulk polymerization of butyl methacrylate occurred with 1 to 2% conversion under the same conditions.

EXAMPLE 5

The technique of Example 1 was employed for plasma initiated copolymerization of methyl methacrylate with styrene. Plasma initiation occurred for 20 to 30 seconds and postpolymerization occurred at 5° C. for 120 hours. Percent polymer conversion was the highest at highest methyl methacrylate concentration. Thus at 100% methyl methacrylate, the percent conversion was 16.7% while at a 60% methyl methacrylate the yield was 0.5%. In contrast, without any plasma initiation, the yield at 100% methyl methacrylate was 1.8% while at 60% methyl methacrylate it was 0.2%.

EXAMPLE 6

Methyl methacrylate (MMA) and methacrylic acid (MAA) were copolymerized in bulk (pure monomers) in various ratios after plasma initiation as set out in Example 1 for 30–60 seconds. Postpolymerization was carried out in 48 hours at 5° C. The conversion percentages are set out in the following table.

TABLE 1

| Monomer feed (Molar ratio) | | |
|---|---|---|
| MMA | MAA | Conversion % |
| 0.76 | 0.24 | 1.7 |
| 0.55 | 0.45 | 2.2 |
| 0.35 | 0.65 | 4.6 |
| 0.17 | 0.83 | 4.5 |

EXAMPLE 7

A series of experiments were performed employing monomer crystals of TOX and TEOX. Such crystals were sublimed under reduced pressure, and then sealed in the thin walled ampule after degassing at $10^{-3}$ to $10^{-4}$ torr. As set out in Example 1. The ampule was then inserted between a pair of parallel plate electrodes connected to the radiofrequency generator of that example. A glow discharge was initiated in the gas space within the ampule for the periods of time also set out in Example 1. During discharge, the temperature of the ampule rose only slightly above the ambient temperature. The polymer yield was determined either immediately after discharge treatment or after set periods of postpolymerization as set out in the following table. In the latter case, the ampule was maintained at 45° C. for TOX and 85° C. for TEOX. To separate the polymer from untreated monomer, the ampule was broken and the contents washed with acetone. The polymer yield was calculated by weighing the remaining polymer after drying in vacuo at 65° C. for TOX or 110° C. for TEOX for 120 hours.

TABLE 2

| Monomer | Power (Watts) | Duration of Discharge (sec.) | Duration of Postpolymerization (hrs.) | Yield (wt %) |
|---|---|---|---|---|
| Trioxane | — | 0 | 66 (in vacuo) | Trace |
| | 40 | 10 | 0 (in vacuo) | 2 |
| | 40 | 30 | 0 (in vacuo) | 4 |
| | 50 | 60 | 66 (in vacuo) | 40 |
| | 40 | 40 | 20 (in air) | 25 |
| Tetraoxane | — | 0 | 72 (in vacuo) | Trace |
| | 40 | 60 | 0 (in vacuo) | 2 |
| | 70 | 30 | 66 (in vacuo) | 4 |
| | 40 | 30 | 3 (in vacuo) | 83 |
| | 40 | 60 | 72 (in air) | 10 |

Referring to the above table, spontaneous polymerization of TOX (at 45° C.) and TEOX (at 85° C.) are negligible after 3 days. Short exposure (up to 60 seconds) to the plasma gave observable yield even without appreciable periods of postpolymerization. However, postpolymerization substantially increased the conversion yield.

EXAMPLE 8

Monomer crystals of 2-vinyl naphthalene were subjected to plasma discharge under the general conditions of Example 7 except that the duration was 10 minutes. The discharge was terminated and the crystals were postpolymerized at 50° C. for 24 hours in vacuo. Good conversion was observed.

What is claimed is:

1. A method of plasma initiated polymerization, comprising the steps of:
   (a) establishing and maintaining a contained zone of ionized gas plasma in contact with a surface of continuous solid or liquid volume of substantially unpolymerized monomer, said ionized gas phase being established and maintained by an electric field which creates a path of electrical conduction totally within said contained zone,
   (b) commencing propagation polymerization of said monomer volume by the creation of active polymerization sites at the interface between said gas plasma and monomer volume caused by activation derived from said ionized gas plasma to partially polymerize said monomer,
   (c) terminating contact between said partially polymerized monomer volume and ionized gas plasma substantially prior to the desired conversion of monomer to polymer and the desired final molecular weight of polymer, and
   (d) postpolymerizing said partially-polymerized monomer volume in the absence of ionized gas plasma to convert monomer to polymer in a proportion of at least two times that converted prior to termination of plasma contact and to yield the desired high molecular weight.

2. The method of claim 1 in which said non-vapor volume is in a single phase.

3. The method of claim 1 in which said post-polymerized polymer is free of an amount of cross-linking which would render it insoluble in a solvent.

4. The method of claim 1 in which said postpolymerized polymer volume is substantially straight-chained.

5. The method of claim 1 in which said monomer is ethylenically unsaturated.

6. The method of claim 4 in which said monomer is a vinyl monomer.

7. The method of claim 4 in which said monomer is selected from the group of methyl methacrylate, methacrylic acid, acrylic acid, methacrylamide, acrylamide, ethyl methacrylate, butyl methacrylate, methyl acrylate, butyl acrylate, and other copolymers thereof with each other or other monomers.

8. The method of claim 1 in which the proportion of monomer conversion to polymer prior to plasma contact termination is less than 10%.

9. The method of claim 1 in which the proportion of monomer conversion to polymer prior to plasma contact termination is less than 2%.

10. The method of claim 1 in which monomer is vaporized from said monomer volume into said gas plasma and is activated thereby to contribute to the propagation polymerization of said monomer.

11. The method of claim 10 in which at least part of said monomer volume is in liquid form and said vaporization is by evaporation.

12. The method of claim 1 in which said gas plasma is subjected to a vacuum.

13. The method of claim 1 in which said monomer volume comprises essentially pure monomer in the liquid state.

14. The method of claim 1 in which said monomer volume comprises a solution of monomer in a solvent.

15. The method of claim 1 in which the ions in said gas plasma directly activate the monomer in said monomer volume to begin propagation.

16. The method of claim 1 in which said monomer volume is in a bulk three-dimensional form in a polymerization vessel and propagation proceeds from its surface in a chain reaction throughout said volume during postpolymerization.

17. The method of claim 1 in which said postpolymerized polymer is self-supporting.

18. The method of claim 1 in which said monomer is in the form of a liquid supported on a substrate and said postpolymerized polymer is in the form of a film adhered to said substrate.

19. The method of claim 1 in which said plasma includes an additional ionized gas other than said monomer.

20. The method of claim 19 in which said monomer is dissolved in a solvent and said additional ionized gas is formed from said solvent vaporizing into said gas plasma zone.

21. The method of claim 1 in which both said monomer of step (a) and said polymer are in solid crystalline form.

22. The method of claim 21 in which the major portion of said crystalline polymer is a single crystal.

23. The method of claim 20 in which said monomer is a cyclic ring compound and said polymerization occurs by opening said cyclic ring.

24. The method of claim 23 in which said cyclic ring compound includes repeating —(R—Z)— units wherein R is a substituted or unsubstituted aliphatic hydrocarbon and Z is selected from the group consisting of oxygen, sulfur and amines.

25. The method of claim 24 in which Z is oxygen, said cyclic compound is a cyclic alkalene ether.

26. The method of claim 25 in which said alkalene ether is selected from the group consisting of trioxane and tetraoxane.

27. The method of claim 21 in which said monomer includes unsaturated carbon to carbon bonds.

28. The method of claim 27 in which said monomer is a vinyl compound.

29. The method of claim 28 in which said vinyl compound is selected from the group consisting of vinyl naphthalene, vinyl anthracene, and acrylamide.

30. The method of claim 27 in which said monomer includes triple bonds.

31. The method of claim 27 in which said monomer comprises substituted or unsubstituted diacetylene.

32. The method of claim 1 in which the post-polymerized polymer is in solid form.

* * * * *